Patented May 24, 1927.

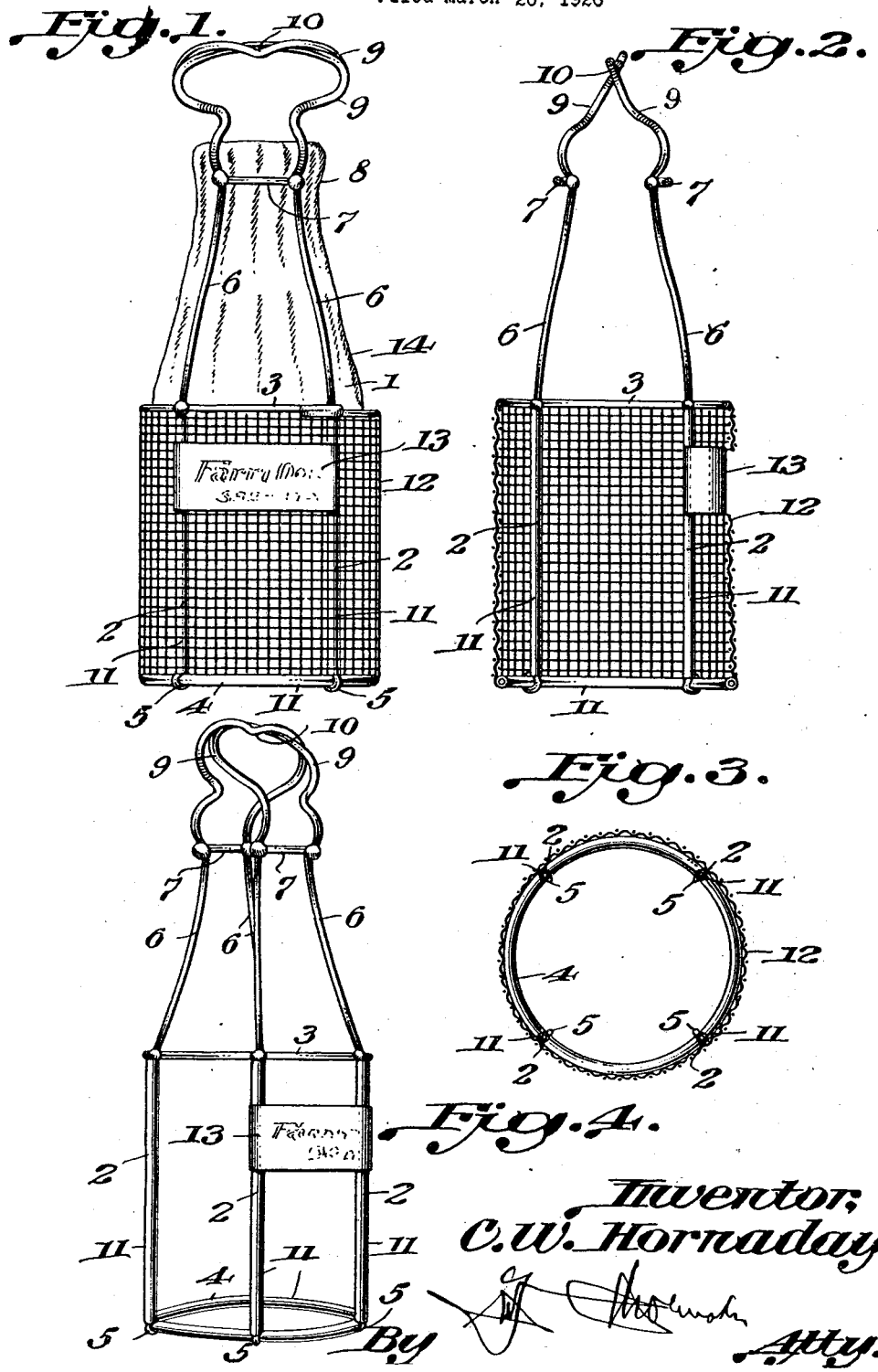

1,629,871

UNITED STATES PATENT OFFICE.

CHARLES W. HORNADAY, OF SIDNEY, NEBRASKA.

SANITARY BOTTLE CARRIER FOR MILK BOTTLES.

Application filed March 20, 1926. Serial No. 96,225.

The invention relates to a sanitary bottle carrier for milk bottles.

The object of the present invention is to provide a simple, practical and efficient bottle carrier of strong, durable and comparatively inexpensive construction adapted for use on milk bottles and other containers and capable of enabling milk bottles to be easily and conveniently handled in a sanitary condition without the hands of the person delivering the milk coming in contact with the milk bottles.

Another object of the invention is to provide a sanitary bottle carrier of this character equipped with a sanitary envelope adapted to completely cover the sides and top of a milk bottle and capable of effectually excluding dust and insects therefrom.

Another object of the invention is to provide a sanitary bottle carrier having means for protecting the lower portions of the bottles to prevent the same from coming in contact and being broken during handling, shipment and delivery of the same.

It is also an object of the invention to provide means for enabling a name plate designed to bear the name of the dairy, shipper or other person handling the milk, to be readily applied to the carrier and displayed in a prominent position.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:

Figure 1 is an elevation of a sanitary milk bottle carrier constructed in accordance with this invention.

Fig. 2 is a central vertical sectional view of the same.

Fig. 3 is a horizontal sectional view of the sanitary milk bottle carrier.

Fig. 4 is a perspective view of the cage or frame.

In the accompanying drawings in which is illustrated the preferred embodiment of the invention, the sanitary milk bottle carrier comprises in its construction, a cage or frame conforming to the configuration of a milk bottle 1 and open at the bottom to enable it to be readily placed over the milk bottle while the latter is in an upright position and also to enable it to be readily removed from the milk bottle after the latter has been placed upon a suitable supporting surface. The cage is composed of opposite pairs of upright resilient members 2 and central and bottom connecting rings 3 and 4 but any number of the upright members and any number of connecting rings may of course be employed as will be readily understood. The upright members and the rings are constructed of suitable material such as steel wire and the wire or other suitable material may be either round in cross section as shown or any other preferred form. The central connecting ring is shown connected with the upright members by welding or soldering and the lower terminals of the upright members are bent or coiled to form eyes 5 in which the lower connecting ring is soldered or welded but the members of the cage may be spot welded or connected in any other desired manner as will be readily understood.

The upper portions 6 of the upright members 2 converge slightly and form bottle clamping portions and are provided with short horizontal connecting jaws 7 which engage under the lip 8 at the mouth of the bottle and clamp and support the latter while in the cage. The clamping portions of the upright members of the cage are connected by handle loops 9 inclined upwardly and inwardly to provide contiguous grip portions as clearly shown in Fig. 4 of the drawing. The handle loops are preferably formed integral with the upright members as shown and they are provided contiguous to the jaws 7 with curved bends conforming to the configuration of the lip 8 and adapted to engage the same when the clamping portions are closed and the grip portions of the handle loops are contiguous and interlocked. One of the grip portions is provided with a central locking projection 10 formed by a bend and adapted to engage the other grip portion to maintain the handle loops in interlocked relation. When the handle loops are contiguous and interlocked and the cage is engaged with the bottle 1, the latter is adapted to be securely carried and handled and the cage may be readily removed from the bottle 1 by separating and spreading the handle loops and thereby opening the clamping portions of the upright members of the cage. The spreading of the handle loops will carry the jaws 7 outwardly beyond the lip 8 of the bottle and will thereby readily disengage the cage from its clamping relation with the bottle. The cage may then be readily lifted off the bottle and the latter deposited where it is to be delivered.

The base of the cage is preferably provided with a coating 11 of rubber vulcanized to the cage and adapted to serve as a protection for the cage and the bottle at the same time and present a neat and attractive appearance. The coating may extend upwardly as far as desirable and it will prevent the base of the cage from coming in contact with wet surfaces and will render the metal of the cage rust-proof.

The sanitary milk bottle carrier is preferably equipped with a covering or guard 12 consisting of a wire screen extending around the exterior of the cage and arranged between the bottom and centrally connecting rings. A wire screen may be secured to the cage in any desired manner and it is adapted to form a guard for preventing the lower enlarged portions of milk bottles from coming in contact with one another and being broken. The screen may or may not be coated with vulcanized rubber. A name plate 13 extends across the space between one of the pairs of upright members and will be arranged exteriorly of the screen guard and suitably secured to the same and to the adjacent upright members preferably by having end portions of the name plate extended through the screen guard and partially coiled around the said upright members. The name plate is adapted to display in a conspicuous position the desired information relative to the sanitary milk carrier or the like.

The sanitary milk carrier is equipped with a sanitary envelope 14 of paper or other suitable material conforming to the configuration of the milk bottle and closed at the top and open at the bottom to enable it to be readily placed over and removed from the milk bottle. The sanitary envelope of the bottle carrier is securely concealed at the top and it is adapted to protect a bottle of milk from dust, insects and other foreign matter and will maintain the same in a perfectly sanitary condition. If desired the sanitary envelope may be left on the bottle after delivery of the latter.

The sanitary bottle carrier may be, if desired, arranged in multiples and will thereby enable a plurality of milk bottles to be conveniently and simultaneously handled and delivered.

What I claim is:

1. A sanitary bottle carrier comprising a cage conforming to the configuration of a bottle and open at the bottom to permit it to be placed over the bottle and provided at the top with resilient bottle clamping portions for engaging and supporting the bottle while the latter is being carried and extending upwardly above the bottle to provide a handle.

2. A sanitary bottle carrier comprising a cage conforming to the configuration of a bottle and open at the bottom to permit it to be placed over the bottle and provided at the top with resilient bottle clamping portions for engaging and supporting the bottle while the latter is being carried, and contiguous handles connected with a clamping portion extending upwardly above the top of the bottle and adapted to be simultaneously grasped.

3. A sanitary bottle carrier comprising a cage conforming to the configuration of a bottle and open at the bottom to permit it to be placed over the bottle and provided at the top with resilient bottle clamping portions for engaging and supporting the bottle while the latter is being carried, and handle loops extending upwardly above the top of the bottle from the bottle clamping portions and provided with contiguous grip portions arranged to be simultaneously grasped, whereby the bottle may be carried and the clamping portions maintained in engagement with the bottle.

4. A sanitary bottle carrier comprising a cage conforming to the configuration of a bottle and open at the bottom to permit it to be placed over the bottle and provided at the top with resilient bottle clamping portions for engaging and supporting the bottle while the latter is being carried, and handle loops extending upward above the top of the bottle from the bottle clamping portions and provided with contiguous grip portions arranged to be simultaneously grasped, one of the grip portions being provided with means for engaging the other grip portion to maintain the handle loops in interlocked relation.

5. A sanitary bottle carrier comprising a cage conforming to the configuration of a bottle and provided at the top with resilient bottle clamping portions arranged to engage and support the bottle while the same is being carried and a wire screen covering the lower portion of the cage forming a guard for protecting the bottle.

6. The combination with a bottle carrier provided at the top with resilient bottle clamping portions arranged to engage and support the bottle while the same is being carried, of a sanitary envelope arranged within the cage and over the top of the mouth of the bottle and between the clamping portions of the cage and the bottle to exclude insects, dust and other foreign matter from the bottle and clamped against the bottle by said clamping portions of the cage, with the cage releasable from the bottle and envelope upon releasing said clamping portions of the cage without removing the envelope from the bottle.

7. A sanitary bottle carrier including a cage composed of upright members and connecting rings and conforming to the configuration of a bottle, the upper portions of the upright members being free and provided with jaws arranged to engage under the lip of the bottle at opposite sides thereof for supporting the latter while the same is being carried, said upright members being extended above the top of the bottle to form a handle.

8. A sanitary bottle carrier including a cage composed of upright members and connecting rings and conforming to the configuration of a bottle, the upper portions of the upright members being free and provided with jaws arranged to engage under the lip of the bottle for supporting the latter while the same is being carried, and handle loops extending from the upper portions of the upright members and converging towards each other to provide contiguous grip portions.

9. A sanitary bottle carrier including a cage composed of upright members and connecting rings and conforming to the configuration of a bottle, the upper portions of the upright members being free and provided with jaws arranged to engage under the lip of the bottle for supporting the latter while the same is being carried, and handle loops extending from the upper portions of the upright members and converging towards each other to provide contiguous grip portions and the sides of the handle loops being provided with bends conforming to the configuration of the lip of the bottle and arranged to clamp the same.

10. A sanitary bottle carrier comprising approximately vertical wires arranged in pairs at opposite sides of the bottle and curved portions connecting the vertical wires, said wires and curved portions forming open loops conforming to the configuration of the body portion of the bottle and extending along the body, said bottle carrier being open at the bottom to permit it to be placed over a bottle, resilient clamping portions arranged at the top of the bottle and curved to conform to the neck of the bottle and engaging under the lip thereof and supporting the bottle while the same is being carried, and handle loops extending upwardly above the top of the bottle from the bottle clamping portions and provided with continuous grip portions arranged to be simultaneously grasped, one of the grip portions being provided with a central bend forming a locking projection to engage the other grip portion for maintaining the handle loops in interlocked relation.

In testimony whereof I have hereunto set my hand.

CHARLES W. HORNADAY.